UNITED STATES PATENT OFFICE.

ROBERT WILHELM STREHLENERT, OF NOL, SWEDEN, ASSIGNOR TO AND. H. KIAER & CO. LTD., OF GLEMMINGE, NEAR FREDRIKSSTAD, NORWAY.

PROCESS OF UTILIZING THE ORGANIC AS WELL AS THE INORGANIC CONSTITUENTS OF THE WASTE LIQUOR PRODUCED BY THE BOILING OF SULFITE CELLULOSE.

1,149,420.     Specification of Letters Patent.     Patented Aug. 10, 1915.

No Drawing.     Application filed August 12, 1912. Serial No. 714,610.

*To all whom it may concern:*

Be it known that I, ROBERT WILHELM STREHLENERT, citizen of Sweden, residing at Nol, Älfsborg, Sweden, have invented new and useful Improvements in Processes of Utilizing the Organic as Well as the Inorganic Constituents of the Waste Liquor Produced by the Boiling of Sulfite Cellulose, of which the following is a specification.

The methods of treating the waste liquors of sulfite cellulose factories hitherto employed have the object of destroying or removing the sulfurous acid in the liquor either by boiling in a current of air or in vacuum or by direct exposure to air or by neutralizing the acid. Even if the part of the sulfur required for the manufacture of the cellulose could thus be regenerated, it is evident that the cost will be too high as ten cubic meters of liquor must be evaporated per one ton cellulose. The distillation of spirit from the liquor only regenerates at most one per cent. of the volume of the liquor.

The object of this invention is to utilize in a simple and cheap way a number of valuable compounds contained in the waste liquors from sulfite cellulose factories and which hitherto have frequently been allowed to escape with the liquors into the watercourses, thus leading to a considerable loss to the manufacturer and having a very injurious effect on the water and the fish in the watercourses.

The invention is founded on the observation that if the free sulfurous acid, and possibly the combined, contained in the liquor is oxidized under a high pressure and a high temperature, the sulfuric acid formed disassociates the lignosulfonites.

In consequence of the ease of disassociation of the organic compounds in accordance with the method herein described and owing to all the sulfurous acid that will be thereby set free and which it is possible to determine quantitively it appears probable that the organic acids in the liquor mainly consist of sulfonites and not of sulfonates as usually supposed. A fuller explanation of this is contained in the book "*Handbuch der Papierfabrikation*" by Carl Hoffman, volume 2, pages 1426 and 1427. It is, however, necessary that the disassociation is caused to take place immediately as the sulfuric acid is formed. The lignine substance is thus precipitated as a light brown powder which is easily separated from the liquor and may afterward be advantageously used for the preparation of all such products as can be obtained in the dry distillation of wood. This oxidation will take place by reason of the heat and pressure alone in accordance with the following equations:

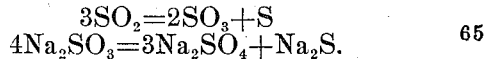

If sulfite of lime be present under similar conditions a similar reaction takes place, causing the oxidation of the sulfite into sulfate of lime, as follows:

Consequently in order to produce such a reaction the sulfite liquor must not be oxidized by chemical agents added to the liquor before this required action takes place, as such oxidation by chemical means will not produce the desired result, as the sulfuric acid set free must act on the organic matters during its formation in other words in *statu nascendi*.

An addition of acids, for example sulfuric acid to the liquor and boiling of the said treated liquor under pressure as described for example, in the German Patent No. 197195 and the additional Patent No. 202132 leads only to the same difficulties as are invariably connected with boiling a liquor containing sulfuric acid and has the further disadvantage that the lignine substance is carbonized and a very poor yield is obtained. Nor is the method profitable, for it requires a considerable quantity of acid and is therefore expensive. Furthermore, the gelatinous product can only be obtained in an amorphous form by further costly treatment and in a more carbonized state.

The main point of my process is that the combined organic constituents of the lye under a high pressure and at a high temperature are subjected to the action of sulfuric acid at the moment the latter is being formed from the sulfurous acid content of the liquor.

The process of oxidation in accordance with this invention may advantageously be carried out in the following manner: The hot liquor as drawn off from the boiler is run into a second boiler or autoclave into which air or oxygen enriched air is forced under suitable pressure (about 20 kilos per sq. cm.) after which the temperature of the air is increased to about 200 centigrades for example by means of a steam-pipe in the autoclave. During this heating period the free sulfurous acid that always occurs in the liquor even though possibly in only a very small quantity, is completely oxidized to sulfuric acid and thus releases the sulfurous acid combined in the sulfonites which will thus be decomposed with the formation of sulfate of lime, possibly also sulfuric acid, free sulfurous acid and organic lignine compounds.

The heat required for the process corresponds to an increase of temperature of the liquor of some 100 degrees centigrade, provided the liquor is drawn off from the first boiler at a temperature of 100 degrees centigrade. The air volume required for the oxidation is rather cheap to procure. The disassociation takes only a few minutes when the necessary pressure and temperature are reached.

Instead of air or oxygen any other suitable oxidizing agent may be used; it is, however, advantageous to choose the cheapest agent.

If the operation is carried out as specified the reaction will progress in a rather sudden manner and the precipitate will then not be in the most suitable form for further treatment. In order to avoid a too rapid precipitation and the inconveniences arising therefrom, it has been found advisable to add to the liquor, preferably before the oxidation process takes place an acid salt which acts to retard the reaction. The precipitate will then assume the above mentioned powdered state. The salt may be a water soluble acid salt. Bisulfate of soda has been found suitable on account of its cheapness; it may be employed in proportion of from some $\frac{1}{2}$ to 2 per cent. If desired all the sulfate of calcium may before the disassociation be separated from the liquor and it is precipitated by means of bisulfite or bi-sulfate of soda. This will result in the advantage that the organic lime salt is converted into a sodium salt which being soluble in water can be extracted and thus a product having a low content of ash can be obtained.

When the waste liquor, before the oxidation process is carried out, is allowed to stand some time after a salt of the character mentioned has been added it has been found that neither pressure or temperature need be increased to the degree stated above; the precipitation occurring at a lower pressure and temperature.

If desired the oxidation may be carried so far that instead of material suitable to be dry distilled a product is obtained which is highly carbonized and which may be advantageously used as fuel. The heating value of said product is found to be some 6000 or 7000 kilogram calories per kilogram according to the manner of manufacture.

If the disassociation of the sulfite liquor is carried out as described between 80 and 95 per cent., according to the manner of manufacture, of the organic and of the inorganic constituents contained in the liquor (including all the sulfurous acid combined in the organic lignine compounds) will be recovered. The remaining liquor is an entirely harmless material which may be discharged in any watercourse without injury thereto.

Having thus particularly described and ascertained the nature of my said invention and in what manner the same is to be performed, what I claim is—

1. The process of separating organic and inorganic constitutents of the spent liquor of sulfite cellulose, which comprises transforming the free and combined sulfurous acid contents of the liquor into sulfuric acid under the combined action of heat and pressure, and simultaneously reacting on the combined organic and inorganic constituents of the liquor with said sulfuric acid during its formation to cause their precipitation.

2. The process of separating organic and inorganic constituents of the spent liquor of sulfite cellulose, which comprises transforming the free and combined sulfurous acid contents of the liquor into sulfuric acid under the combined action of heat and pressure in the presence of an oxidant of sulfurous acid, and simultaneously reacting on the combined organic and inorganic constituents of the liquor with said sulfuric acid during its formation to cause their precipitation.

3. The process of separating organic and inorganic constituents of the spent liquor of sulfite cellulose which comprises transforming the free and combined sulfurous acid contents of the liquor into sulfuric acid under the combined action of heat and pressure and simultaneously reacting on the combined organic and inorganic constituents of the liquor in the presence of a reaction retarder with said sulfuric acid during its formation to cause their precipitation.

4. The process of separating organic and inorganic constituents of the spent liquor of sulfite cellulose, which comprises transforming the free and combined sulfurous acid contents of the liquor into sulfuric acid under the combined action of heat and pressure, in the presence of an oxidant of sulfurous acid, and simultaneously reacting on the combined organic and inorganic constituents of the liquor, in the presence of a reaction retarder, with said sulfuric acid during the formation of the latter to cause the precipitation of said constituents.

5. The process of separating organic and inorganic constituents of the spent liquor of sulfite cellulose which comprises transforming the free and combined sulfurous acid contents of the liquor into sulfuric acid under the combined action of heat and pressure, in the presence of oxygen or air, and simultaneously reacting on the combined organic and inorganic constituents of the liquor with said sulfuric acid, during its formation to cause the precipitation of said constituents.

6. The process of separating organic and inorganic constituents of the spent liquor of sulfite cellulose, which comprises transforming the free and combined sulfurous acid contents of the liquor into sulfuric acid under the combined action of heat and pressure, and simultaneously reacting on the combined organic and inorganic constituents of the liquor in the presence of an acid salt, with said sulfuric acid during its formation to cause their precipitation.

7. The process of separating organic and inorganic constituents of the spent liquor of sulfite cellulose which comprises transforming the free and combined sulfurous acid contents of the liquor into sulfuric acid under the combined action of heat and pressure, and simultaneously reacting on the combined organic and inorganic constituents of the liquor in the presence of an acid salt soluble in water, with said sulfuric acid during its formation to cause their precipitation.

8. The process of separating organic and inorganic constituents of the spent liquor of sulfite cellulose which comprises transforming the free and combined sulfurous acid contents of the liquor into sulfuric acid under the combined action of heat and pressure, and simultaneously reacting on the combined organic and inorganic constituents of the liquor in the presence of bisulfate of soda with said sulfuric acid during its formation to cause their precipitation.

9. The process of separating organic and inorganic constituents of the spent liquor of sulfite cellulose which comprises transforming the free and combined sulfurous acid contents of the liquor into sulfuric acid under the combined action of heat and pressure, in the presence of oxygen or air, and simultaneously reacting on the combined organic and inorganic constituents of the liquor, in the presence of bisulfate of soda, with said sulfuric acid during the formation of the latter to cause the precipitation of said constituents.

10. The process of oxidizing the sulfite constituents of spent sulfite liquors, which comprises subjecting the same to heat and pressure.

In testimony whereof I have hereunto set my hand in presence of two subscribing witnesses.

ROBERT WILHELM STREHLENERT.

Witnesses:
 ERIC WIDHOLM,
 ANNA HÅKANSON.